(12) United States Patent
Jain

(10) Patent No.: US 12,013,811 B1
(45) Date of Patent: Jun. 18, 2024

(54) SYSTEM AND METHOD OF WORKLOAD MANAGEMENT FOR DISTRIBUTING WORKLOAD OVER SIMD BASED PARALLEL PROCESSING ARCHITECTURE

(71) Applicant: Innoplexus AG, Eschborn (DE)

(72) Inventor: Adarsh Jain, Pune (IN)

(73) Assignee: INNOPLEXUS AG, Eschborn (DE)

( * ) Notice: Subject to any disclaimer, the term of this patent is extended or adjusted under 35 U.S.C. 154(b) by 0 days.

(21) Appl. No.: 18/060,615

(22) Filed: Dec. 1, 2022

(51) Int. Cl.
  *G06F 15/80* (2006.01)
  *G06F 9/38* (2018.01)

(52) U.S. Cl.
  CPC ........ *G06F 15/8007* (2013.01); *G06F 9/3887* (2013.01)

(58) Field of Classification Search
  None
  See application file for complete search history.

(56) References Cited

U.S. PATENT DOCUMENTS

| | | | | |
|---|---|---|---|---|
| 5,787,234 | A * | 7/1998 | Molloy | G06N 5/027 706/54 |
| 7,447,683 | B2 * | 11/2008 | Quiroga | G06F 16/951 707/999.005 |
| 7,548,910 | B1 * | 6/2009 | Chu | G06F 16/3338 707/999.005 |
| 2006/0080315 | A1 * | 4/2006 | Mitchell | G06F 16/3344 |
| 2007/0055948 | A1 * | 3/2007 | Cui | G06F 16/367 345/619 |
| 2011/0078205 | A1 * | 3/2011 | Salkeld | G06F 16/3344 707/794 |
| 2016/0259826 | A1 * | 9/2016 | Acar | G06F 16/9535 |
| 2017/0161619 | A1 * | 6/2017 | Franceschini | G06N 5/022 |
| 2020/0372057 | A1 * | 11/2020 | Tonkin | G06F 16/211 |
| 2023/0039937 | A1 * | 2/2023 | Wendell | G16H 15/00 |

FOREIGN PATENT DOCUMENTS

| CN | 110633348 A | 12/2019 |
|---|---|---|
| CN | 114586028 A | 6/2022 |

OTHER PUBLICATIONS

Furrer, et al., "Parallel sequence tagging for concept recognition", The 5th workshop on BioNLP Open Shared Tasks Hong Kong, China, Nov. 4, 2019, pp. 1-17.

* cited by examiner

Primary Examiner — Eric Coleman
(74) Attorney, Agent, or Firm — Ziegler IP Law Group

(57) ABSTRACT

A method of workload management for distributing workload over a single instruction and multiple data (SIMD) based parallel processing architecture includes pre-processing of vert large ontology file on the host processor. The outcome of the preprocessing step is a set of arrays which are loaded on the SIMD based parallel processing architecture to process the ontology file over input text documents of any kind and generate the tagged outcome. The method provides the maximum granularity to facilitate allocation of the maximum number of software threads on the SIMD based parallel processing architecture to achieve minimum document processing latency.

20 Claims, 4 Drawing Sheets

SYSTEM AND METHOD OF WORKLOAD MANAGEMENT FOR DISTRIBUTING WORKLOAD OVER SIMD BASED PARALLEL PROCESSING ARCHITECTURE

FIELD OF TECHNOLOGY

The present disclosure relates generally to workload management over a processing architecture; and more specifically, to a system and a method of workload management for distributing workload (e.g., an ontology task) over a single instruction and multiple data (SIMD) based parallel processing architecture.

BACKGROUND

In computing technology, workload typically refers to the amount of work (or load) that execution of a given task (e.g., a software or a file) imposes on the underlying computing resources. A heavy workload demands significant amounts of computing resources, for example, processors, central processing unit (CPU) clock cycles, storage input/output (I/O), etc. Typically, for maintaining data pertaining to a domain in a conventional search engine or a data warehouse for data analytics, it is important to tag documents with ontology. Document tagging refers to the process of finding and masking the known keywords in a document with relevant concepts or ontology. In computing and information science technology, ontology is a way of showing the properties of a technical subject area and how they are related, by defining a set of concepts and categories that represent the subject. In other words, the ontology is a formal description of knowledge as a set of concepts within a domain and the relationships that are held between them. Typically, for tagging an input document, each synonym of each concept in ontology needs to be searched in the input document and if a concept is found, the document is usually marked with it.

In certain scenarios, it may be required to execute workload (e.g., concept tagging) with a large ontology file (e.g., having millions of synonyms and concepts). In such scenarios, such workload execution typically demands significant amounts of computing resources. Existing ontology tagging solutions are based on non-SIMD based architecture, for example, CPU based solutions. The non-SIMD based architecture, like a CPU, may have multiple processors and can execute multiple instructions at the same time on multiple processors but the instructions will not be the same as the control unit is going to be different for each processor. Thus, there is a technical problem of a coarse granularity manifested by existing solutions of workload management and distribution, especially when employed in concept tagging with the large ontology file. In other words, there exists a technical problem of how to enhance workload distribution, for example, in concept tagging field to handle large ontology files, to optimize usage of computing resources.

Further limitations and disadvantages of conventional and traditional approaches will become apparent to one of skill in the art through comparison of such systems with some aspects of the present disclosure, as set forth in the remainder of the present application with reference to the drawings.

BRIEF SUMMARY OF THE DISCLOSURE

The present disclosure provides a system and a method of workload management for distributing workload over a single instruction and multiple data (SIMD) based parallel processing architecture. The present disclosure seeks to provide a solution to the existing problem of coarse granularity manifested by existing solutions of workload management and distribution, especially when employed in concept tagging of input text documents. In other words, there exists a technical problem of how to enhance workload distribution, for example, in the concept tagging field to handle large ontology file, in order to optimize usage of computing resources. An aim of the present disclosure is to provide a solution that overcomes at least partially the problems encountered in prior art and provide an improved system and method of workload management that distributes the workload (e.g., an ontology task) over the SIMD based parallel processing architecture in a way such that a maximum granularity is achieved while processing a document and later accesses content of synonyms with reduced latency and increased granularity during a search.

In one aspect, the present disclosure provides a method of workload management for distributing workload over the SIMD based parallel processing architecture. The method comprising:

loading, by a first processor, an ontology file in a first memory to determine a total number of synonyms, a total number of concepts, and a total number of characters of a plurality of synonyms in the ontology file;

establishing, by the first processor, a mapping relationship between one or more synonyms and a concept identifier of each concept of a plurality of concepts in the ontology file;

forming, by the first processor, a first array to store a length of each synonym associated with each concept, a second array to store each character of each synonym associated with each concept, and a third array to store a start position of each synonym stored in the second array;

allocating, by the first processor, each synonym in the second array to a corresponding software thread of a set of software threads; and uploading, by the first processor, the first array, the second array, and the third array to a second memory of a SIMD based processing device having a set of processors, wherein content of each synonym associated with each concept is concurrently accessible on the SIMD based processing device from the uploaded second array by the set of processors via the set of software threads.

The allocation of each synonym in the second array to a corresponding software thread of the set of software threads followed by uploading of the different arrays, such as the first array, the second array, and the third array, to the second memory of the SIMD based processing device, corresponds to an improved way of distribution of synonyms with improved granularity over the SIMD based processing architecture, such as the SIMD based processing device. The SIMD based processing device, such as Graphical Processing Units (GPUs) have thousands of processing units, such as the set of processors, which may be utilized by allocating or distributing software threads, such as the set of software threads and assigning isolated tasks to each software thread for finding ontology in a given text document. In other words, in order to find the concepts in the given input text document, all the synonyms that belong to a concept, are searched in the given input text document and the concepts that are present in the given input text document are maintained as the metadata of the given input text document. To achieve improved latency (i.e., lowest latency) for finding ontology in the given input text document, while using SIMD based architectures, such as the SIMD based processing device, each software thread of the set of software threads, is assigned to process one synonym [1 to N is possible to improve granularity] but minimum shall be 1 to achieve maximum granularity.

In another aspect, the present disclosure provides a system for workload management for distributing workload over a single instruction and multiple data (SIMD) based parallel processing architecture, the system comprising:

a first processor and a first memory, wherein the first processor is configured to:
load an ontology file in the first memory to determine a total number of synonyms, a total number of concepts, and a total number of characters of a plurality of synonyms in the ontology file;
establish a mapping relationship between one or more synonyms with a concept identifier (ID) of each concept of a plurality of concepts in the ontology file;
form a first array to store a length of each synonym associated with each concept, a second array to store each character of each synonym associated with each concept, and a third array to store a start position of each synonym stored in the second array;
allocate each synonym in the second array to a corresponding software thread of a set of software threads; and a SIMD based processing device that comprises a second memory and a set of processors, wherein the set of processors are configured to concurrently access content of each synonym of each concept from the second array via the set of software threads.

The method achieves all the advantages and technical effects of the system of the present disclosure.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations constructed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
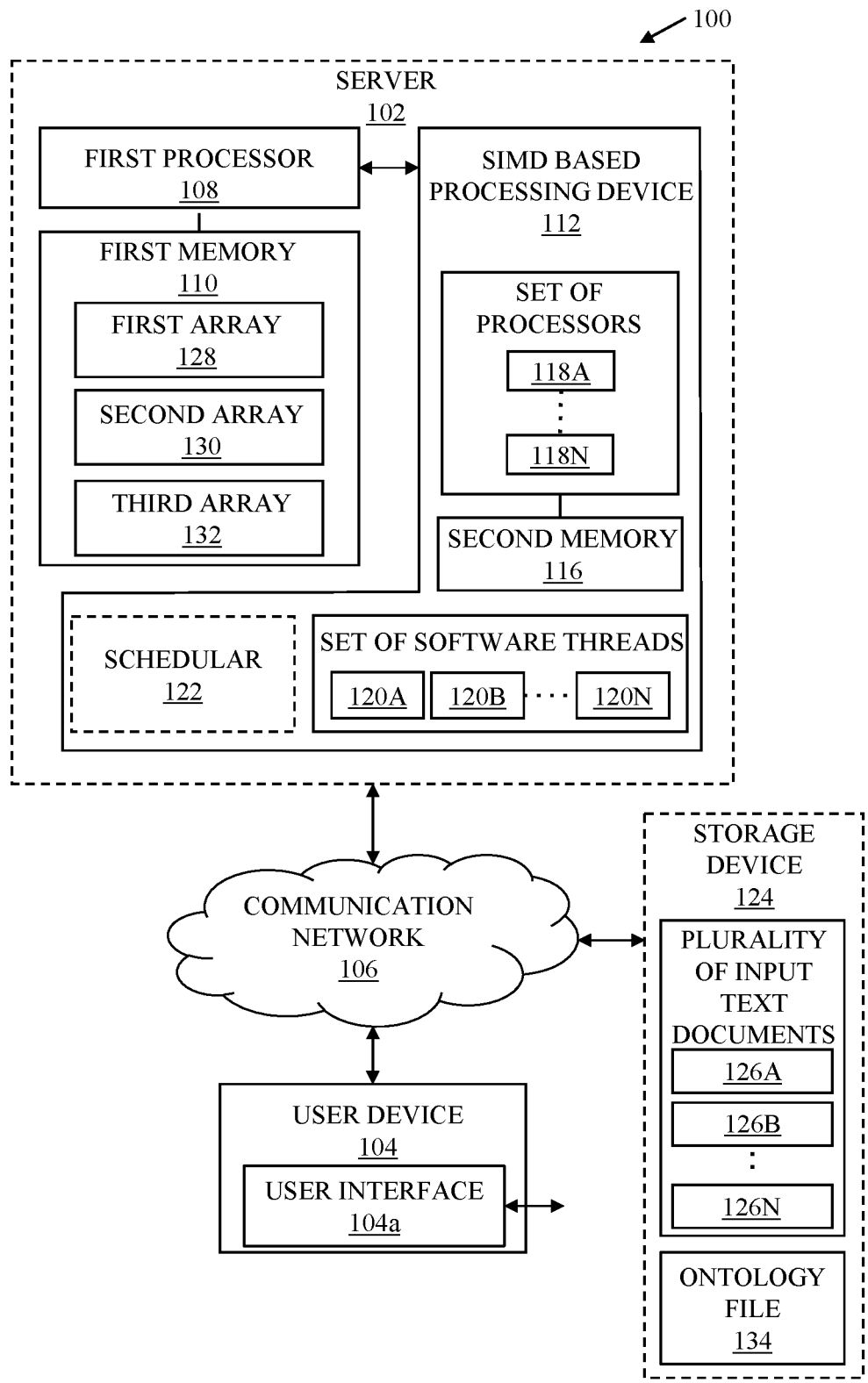
FIG. 1 is a block diagram of a system for workload management for distributing workload over a single instruction and multiple data (SIMD) based parallel processing architecture, in accordance with an embodiment of the present disclosure.

FIG. 1 is a block diagram of a system for workload management for distributing workload over a single instruction and multiple data (SIMD) based parallel processing architecture, in accordance with an embodiment of the present disclosure. With reference to FIG. 1, there is shown a block diagram of a system 100. The system 100 includes a first processor 108, a first memory 110, and a SIMD based processing device 112. The SIMD based processing device 112 includes a second memory 116, a set of processors 118A to 118N, a set of software threads 120A to 120N, and a schedular 122. The first processor 108 is communicably coupled to the first memory 110 and the SIMD based processing device 112.

In an implementation, the first processor 108, the first memory 110, and the SIMD based processing device 112 may be implemented on the same server, such as the server 102. In another implementation, the first processor 108 and the first memory 110 may be implemented in one device, such as the server 102, whereas one or more SIMD based processing devices (e.g., Graphical Processing Units (GPUs), such as the SIMD based processing device 112, may be implemented in another device, such as another server. In some implementation, the system 100 further includes a storage device 124 communicably coupled to the server 102 via a communication network 106. The storage device 124 includes a plurality of input text documents 126A to 126N. In another implementation, the plurality of input text documents 126A to 126N, and the ontology file 134 may be stored in the same server, such as the server 102. The server 102 may be communicably coupled to a plurality of user devices, such as a user device 104, via the communication network 106. The user device 104 includes a user interface 104a.

The present disclosure provides the system 100 for workload management for distributing workload over the SIMD based parallel processing architecture, where the system 100 divides the workload and distributes the workload over one or more SIMD based parallel processing devices (i.e., SIMD based parallel processing architecture). The workload refers to text-based documents that may include content associated with one or more multiple technical domains. The SIMD based parallel processing architecture refers to a parallel processing architecture that includes multiple processing units under the supervision of a common control unit. In an implementation, the SIMD based parallel processing architecture may be an external powered device plugged into a peripheral component interconnect (PCI) express slot of a motherboard of the server 102. The PCI express is primarily used as a standardized interface for motherboard components including graphics, memory, and storage.

The server 102 includes suitable logic, circuitry, interfaces, and code that may be configured to communicate with the user device 104 via the communication network 106. In an implementation, the server 102 may be a master server or a master machine that is a part of a data center that controls an array of other cloud servers communicatively coupled to it for load balancing, running customized applications, and efficient data management. Examples of the server 102 may include, but are not limited to a cloud server, an application server, a data server, or an electronic data processing device.

The user device 104 refers to an electronic computing device operated by a user. The user device 104 may be configured to obtain a user input of one or more words in a search engine rendered over the user interface 104a and communicate the user input to the server 102. The server 102 may then be configured to retrieve a relevant document or an unstructured text using the SIMD based processing device 112. The content of one or more synonyms related to the one or more words and associated concept is searched on at least the SIMD based processing device 112 with a computational granularity greater than a defined threshold. Examples of the user device 104 may include, but are not limited to, a mobile device, a smartphone, a desktop computer, a laptop computer, a Chromebook, a tablet computer, a robotic device, or other user devices.

The communication network 106 includes a medium (e.g., a communication channel) through which the user device 104 communicates with the server 102. The communication network 106 may be a wired or wireless communication network. Examples of the communication network 106 may include, but are not limited to, Internet, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet.

The first processor 108 is configured to load an ontology file in the first memory 110 to determine a total number of synonyms, a total number of concepts, and a total number of characters of a plurality of synonyms in the ontology file. The first processor 108 is further configured to execute instructions stored in the first memory 110. Examples of the first processor 108 may include, but are not limited to, a central processing unit (CPU), a microprocessor, a microcontroller, or other non-SIMD based processor.

The first memory 110 refers to a primary storage of the server 102. The first memory 110 includes suitable logic, circuitry, and interfaces that may be configured to store the user input received from the user devices, such as the user device 104, and the instructions executable by the first processor 108. Examples of the first memory 110 may include, but are not limited to, Electrically Erasable Programmable Read-Only Memory (EEPROM), Read Only Memory (ROM), Hard Disk Drive (HDD), Solid-State Drive (SSD), and/or CPU cache memory.

The SIMD based processing device 112 refers to an external powered processing device that may be connected to a motherboard of the server 102. Specifically, the SIMD based processing device 112 refers to a computing architecture that includes multiple processors under the supervision of a common controller. Such processors receive the same instruction from the common controller but operate on different items of data. In accordance with an embodiment, the SIMD based processing device 112 is at least one of the graphical processing unit (GPU), or other SIMD based parallel processing device. The SIMD based processing device 112 includes multiple processors or processing cores, such as the set of processors 118A to 118N, and the second memory 116 (e.g., the memory of GPU). The set of processors 118A to 118N receive the same instruction from the control unit, such as the first processor 108 or an in-built controller that receives the instruction from the first processor 108 but operates on different data items.

The SIMD based processing device 112 further includes multiple software threads, such as the set of software threads 120A to 120N, and the schedular 122. Each software thread of the set of software threads 120A to 120N refers to a basic ordered sequence of instructions designed to be scheduled and executed by a processor, such as the first processor 108. The schedular 122 refers to a component that decides a priority of each software thread of the set of software threads 120A to 120N. In other words, the schedular 118 may decide which software thread to run or execute and which software thread to wait under the control of the first processor 108. In an example, the set of software threads 120A to 120N and the schedular 122 may be a part of a GPU driver. In some implementations, the set of software threads 120A to 120N may be provided by an operating system, commonly known as OS.

The storage device 124 may be any storage device that stores data and applications, without any limitation thereto. In an implementation, the storage device 124 may be a cloud storage, or an array of storage devices. The storage device 124 includes the plurality of input text documents 126A to 126N, and the ontology file 134. Each input text document of the plurality of input text documents 126A to 126N may be a research paper, a patent, an article, or any other text document, without any limitation thereto. The ontology file 134 includes a plurality of concept identifiers C1 to Cn (shown in FIG. 3) and a plurality of synonyms S1 to Sn (shown in FIG. 3). Each concept identifier of the plurality of concept identifiers C1 to Cn is associated with one or more synonyms of the plurality of synonyms S1 to Sn.

In accordance with an embodiment, the ontology file 134 includes an ontology in a predetermined format. The ontology may refer to a set of concepts pertaining to a particular field or domain and the one or more synonyms associated with each of the set of concepts. The predetermined format for the ontology file 134 may be defined as a specified format of arranging the one or more synonyms with a corresponding concept identifier (e.g., an elastic search format). The predetermined format for an exemplary ontology file is provided as shown below.

A1, A2, A3 . . . An=>Bn, where Bn depicts a concept identifier of a concept and A1, A2, A3 . . . An depicts "n" number of synonyms associated with the concept identifier of the concept i.e., Bn.

In operation, the first processor 108 is configured to load the ontology file 134 in the first memory 110 to determine a total number of synonyms, a total number of concepts, and a total number of characters of the plurality of synonyms S1 to Sn in the ontology file 134. Specifically, the first processor 108 is configured to load the ontology file 134 in the first memory 110 from the storage device 124.

The first processor 108 is further configured to establish a mapping relationship between the one or more synonyms with the concept identifier C1 to Cn of each concept of the plurality of concepts in the ontology file 134. In an example, the first processor 108 establishes a mapping relationship between three synonyms S1, S2, and S3 with a first concept identifier C1, and a mapping relationship between two synonyms S5 and S6 with a second concept identifier C2.

The first processor 108 is configured to form a plurality of buckets (shown in FIG. 3, in an example) to accommodate the one or more synonyms of each concept associated with a corresponding concept identifier C1 to Cn. Using the above example, if the three synonyms S1, S2, and S3 are mapped with the first concept identifier C1 and the two synonyms S4 and S5 are mapped with the second concept identifier C2, the three synonyms S1, S2, and S3 are accommodated in a first bucket of the plurality of buckets, and the two synonyms S4 and S5 are accommodated in a second bucket of the plurality of buckets.

The first processor 108 is further configured to form a first array 128 to store a length of each synonym associated with each concept in the ontology file 134. In other words, the first array 128 stores a count of a total number of characters of each synonym of the plurality of synonyms S1 to Sn as array elements in corresponding indexes of the first array 128. In an example, if a first synonym S1 is "lung" and a second synonym S2 is "cancer", the first array 124 stores "4" and "6" as a first array element and a second array element in index "0" and index "1", respectively.

The first processor 108 is further configured to form a second array 130 to store each character of each synonym associated with each concept in the ontology file 134. In an example, if the ontology file 134 includes about 5 million synonyms, the second array 130 stores each character of each synonym as array elements in corresponding indexes. In accordance with an embodiment, the first processor 108 is further configured to define a first length to the second array 130 based on the total number of characters of the plurality of synonyms S1 to Sn for forming the second array 130. In an example, the ontology file 134 includes only two synonyms S1 and S2 each having different length. When the first synonym S1 is "lung" and the second synonym S2 is "cancer", the first length of the second array 130 is defined by the first processor 108 as "10". In accordance with an embodiment, the second array 130 is a byte array of the first length.

The first processor 108 is further configured to determine a start position of each synonym stored in the second array 130. The start position of the first synonym S1 stored in the second array 130 is predefined, i.e., "0". The start position of the second synonym S2 stored in the second array 130 may be determined by adding the start position of the first synonym S1, i.e., "0" and the length of the first synonym S1. Similarly, the start position of each synonym stored in the second array 130 may be determined.

The first processor 108 is further configured to form a third array 132 to store the start position of each synonym stored in the second array 130. In other words, the third array 132 stores a position of a first character of each synonym stored in the second array 130. In an example, if the first synonym S1 is "lung" and the second synonym S2 is "cancer", the third array 132 stores "0" and "4" as a first array element and a second array element in index 0 and index 1, respectively.

The first processor 108 is further configured to allocate each synonym in the second array 130 to a corresponding software thread of the set of software threads 120A to 120B. In an example, the first synonym S1 is allocated to a first software thread 120A and the second synonym S2 is allocated to the second software thread 120B, and so on. In other words, each synonym in the second array 130 is distributed to a corresponding software thread of the set of software threads 120A to 120B.

In accordance with an embodiment, the first processor 108 is further configured to upload the first array 128, the second array 130, and the third array 132 to the second memory 116 of the SIMD based processing device 112. As discussed above, the SIMD based processing device 112 includes the set of processors 118A to 118N. The set of processors 118A to 118N are configured to concurrently access content of each synonym of each concept from the second array 130 via the set of software threads 120A to 120N. The allocation of each synonym in the second array 130 to a corresponding software thread of the set of software threads 120A to 120B followed by uploading of the different arrays, such as the first array 128, the second array 130, and the third array 132, to the second memory 116 of the SIMD based processing device 112, corresponds to an improved way of distribution of synonyms with improved granularity over the SIMD based Parallel processing architecture, such as the SIMD based processing device 112. The SIMD based processing device 112, such as GPUs have thousands of processing units, such as the set of processors 118A to 118N, which can be utilized by allocating or distributing software threads, such as the set of software threads 120A to 120N and assigning isolated tasks to each software thread for finding ontology in a given input text document. In other words, in order to find the concepts in the given input text document, all the synonyms that belong to a concept is searched in the given input text document and the concepts that are present in the given input text document are maintained as the metadata of the given input text document. To achieve improved latency (i.e., lowest latency) for finding ontology in the given input text document, while using SIMD based architectures, such as the SIMD based processing device 112, each software thread of the set of software threads 120A to 120N, is assigned to process one synonym [1 to N is possible to improve granularity] but minimum shall be 1 to achieve maximum granularity. Advantageously, the distribution of the ontology file 134 among the set of software threads 120A to 120N of the SIMD based processing device 112 may need to be completed only once.

In accordance with an embodiment, the SIMD based processing device 112 is further configured to process the input text document 126A independent of a host language in which the SIMD based processing device 112 is hosted. The operations of the first processor 108 and the SIMD based processing device 112 will be further explained in detail, for example, in FIG. 3. It should be understood by one of ordinary skills in the art that the operations of the system 100 is explained by using the input text document 126A. However, the operation of the system 100 is equally applicable for each input text document of the plurality of input text documents 126A to 126N, and there may be more than one SIMD based processing device 112 in practice.

Figure 2:
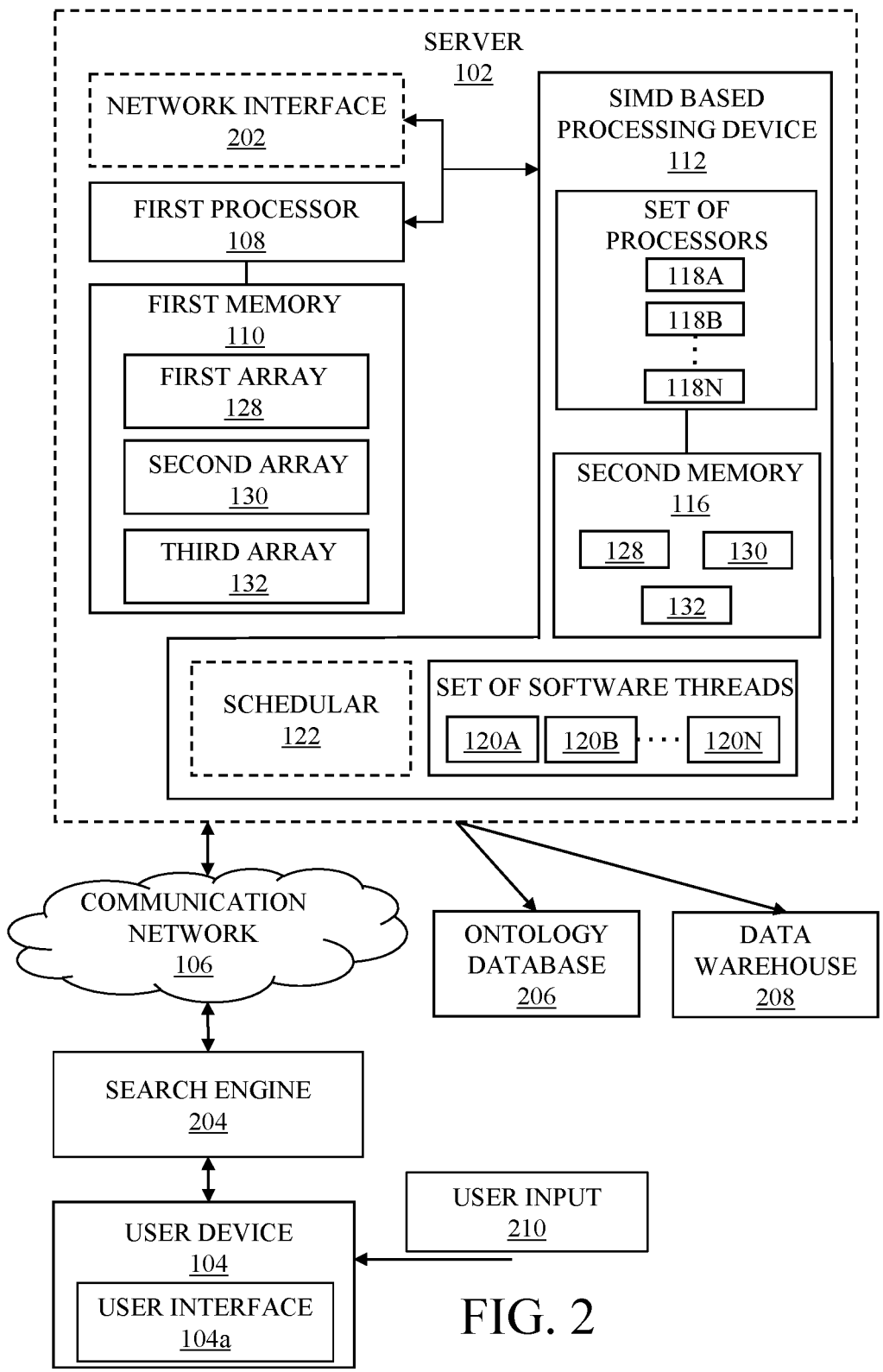
FIG. 2 is a detailed block diagram of the system for the workload management for distributing workload over the SIMD based parallel processing architecture, in accordance with an embodiment of the present disclosure.

FIG. 2 is a detailed block diagram of the system for the workload management for distributing workload over the SIMD based parallel processing architecture, in accordance with an embodiment of the present disclosure. FIG. 2 is explained in conjunction with elements from FIG. 1. With reference to FIG. 2, there is shown a detailed block diagram of the system 100 of FIG. 1 with the server 102. Some of the components of the system 100, that are shown in FIG. 1, may not be shown in FIG. 2 for illustrative purposes. The server 102 may further include a network interface 202. The network interface 202 is configured to communicate with the first processor 108, and the SIMD based processing device 112. The second memory 116 of the SIMD based processing device 112 stores the uploaded first array 128, the uploaded second array 130, and the uploaded third array 132. The system 100 further includes a search engine 204 communicably connected with the server 102 and accessible by the user device 104, via the user interface 104a rendered on the user device 104. The system 100 further includes an ontology database 206 and a data warehouse 208 communicably connected to the server 102.

The network interface 202 refers to a communication interface to enable communication of the server 102 to any other external device, such as the user device 104. Examples of the network interface 202 include, but are not limited to, a network interface card, a transceiver, and the like.

The search engine 204 refers to a search platform to enable a user to carry out web searches. The search engine 204 uses the concept tagging of documents by the system 100 stored as metadata (e.g., the concepts that are present in the given input text document are maintained as the metadata of the given input text document) to improve search and retrieval capability with low latency and high granularity. In one example, the set of processors 118A to 118N are configured to concurrently access content of each synonym of each concept from the second array 130 via the set of software threads 120A to 120N.

The ontology database 206 refers to a collection of ontology related data that represents a set of concepts pertaining to a particular field/domain. The data warehouse 208 refers to an information system that stores historical and commutative data from single or multiple sources in order to analyze data.

In operations, in order to access content of a given synonym stored at a designated position of the uploaded second array 130 on the SIMD based processing device 112, at least one of the set of processors 118A to 118N is further configured to derive the start position of the given synonym from the uploaded third array 132 by accessing the designated position in the uploaded third array 132. In an example, in order to access content of a given synonym stored at a first position of the uploaded second array 130 on the SIMD based processing device 112, the processor 118A derives the start position of the given synonym from the uploaded third array 132 by accessing a first position in the uploaded third array 132. In another example, if the given synonym is "lung" and stored at the first position of the uploaded second array 130 on the SIMD based processing device 112, the start position of the given synonym is "0".

In order to access the content of the given synonym stored at the designated position of the uploaded second array 130 on the SIMD based processing device 112, at least one of the set of processors 118A to 118N is further configured to determine a length of the given synonym from the uploaded first array 128 by accessing the designated position in the uploaded first array 128. In an example, in order to access the content of the given synonym stored at the first position of the uploaded second array 130 on the SIMD based processing device 112, the processor 118A determines a length of the given synonym from the uploaded first array 128 by accessing a first position in the uploaded first array 128. In another example, if the given synonym is "lung" and stored at the first position of the uploaded second array 130 on the SIMD based processing device 112, the length of the given synonym is "4".

In order to access the content of the given synonym stored at the designated position of the uploaded second array 130 on the SIMD based processing device 112, at least one of the set of processors 118A to 118N is further configured to derive an end position of the given synonym by adding the length and the start position of the given synonym, and subtracting "1". In an example, in order to access the content of the given synonym stored at the first position of the uploaded second array 130 on the SIMD based processing device 112, the processor 118A derives an end position of the given synonym by adding an array element at the first position in the uploaded first array 128 and an array element at the first position in the uploaded third array 132, and subtracting "1". In another example, if the given synonym is "lung" and stored at the first position of the uploaded second array 130 on the SIMD based processing device 112, the end position of the given synonym is "3".

In order to access the content of the given synonym stored at the designated position of the uploaded second array 130 on the SIMD based processing device 112, at least one of the set of processors 118A to 118N is further configured to access characters of the given synonym by accessing a group of characters between the start position and the end position of the given synonym from the uploaded second array 130. In an example, if the given synonym is "lung" and stored at the first position of the uploaded second array 130 on the SIMD based processing device 112, the processor 118A accesses the characters, i.e., 1, u, n, g, of the given synonym by accessing a group of characters between the start position i.e., "0" and the end position i.e., "3" of the given synonym from the uploaded second array 130. Thus, each synonym of each concept is accessible in the ontology file 134 by accessing and comparing the characters of each synonym stored in the uploaded second array 130.

Each input text document of the plurality of input text documents 126A to 126N is loaded separately in the SIMD based processing device 112 for concept tagging. Each synonym associated with each concept in the ontology file 134 is searched in each input text document of the plurality of input text documents 126A to 126N by accessing and comparing the characters of each synonym stored in the uploaded second array 130 with the content of each input text document of the plurality of input text documents 126A to 126N. When one or more synonyms of a specific concept is found in an input text document of the plurality of input text documents 126A to 126N, the input text document is marked and/or tagged with the specific concept. Similarly, each input text document of the plurality of input text documents 126A to 126N is marked and/or tagged with at least one specific concept. In some examples, when one or more synonyms of multiple concepts is found in an input text document, the input text document may be tagged with multiple concepts.

In accordance with an embodiment, the first processor 108 is further configured to form the ontology database 206 or the data warehouse 208 of a technical domain for the search engine 204 based on performing concept tagging of the plurality of input text documents 126A to 126N on the SIMD based processing device 112 with the computational granularity greater than the defined threshold. The search engine 204 helps in finding relevant information using keywords or phrases with improved latency and granularity while minimizing use of computational resources.

In accordance with an embodiment, the first processor 108 is further configured to receive a user input 210 of one or more words in the search engine. The user input 210 is received by the first processor 108 in the search engine via the user device 104. In an example, the user input 210 is received via the user interface 104a rendered on the user device 104. The first processor 108 is further configured to retrieve a relevant document or an unstructured text using the SIMD based processing device 112. In addition, content of one or more synonyms related to the one or more words and associated concept is searched on at least the SIMD based processing device 112 with the computational granularity greater than the defined threshold, based on the uploaded first array 128, the uploaded second array 130, and the uploaded third array 132 by the set of processors 118A to 118N via the set of software threads 120A to 120N.

In an example, the data warehouse 208 may also be communicably connected to the search engine 204, via the communication network 106. In such example, the first processor 108 may retrieve a relevant document or an unstructured text from the data warehouse 208 based on the user input 210. Further, the relevant document or the unstructured text retrieved using the SIMD based processing device 112 may be displayed on the user device 104 or an external display device (not shown).

Figure 3:
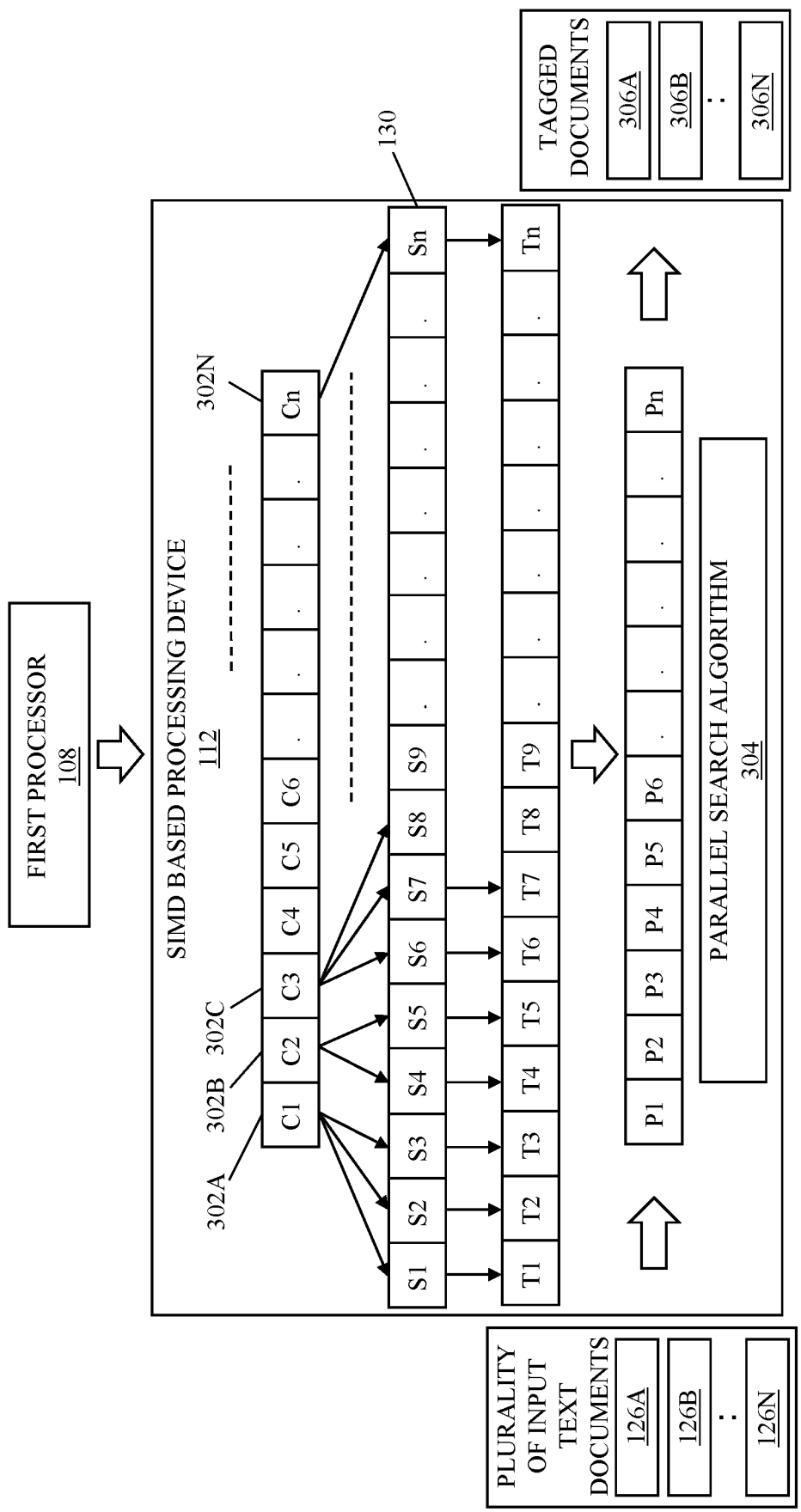
FIG. 3 is a diagram that illustrates implementation of the system for workload management for distributing workload over SIMD based parallel processing architecture, in accordance with an embodiment of the present disclosure.

FIG. 3 is a diagram that illustrates implementation of the system for workload management for distributing workload over SIMD based parallel processing architecture, in accordance with an embodiment of the present disclosure. FIG. 3 is explained in conjunction with elements from FIGS. 1 and 2. With reference to FIG. 3, there is shown an exemplary diagram depicting distribution of the plurality of synonyms S1 to Sn associated with the plurality of concepts in the ontology file 134 among the set of software threads 120A to 120N. As illustrated in FIG. 3, the ontology file 134 is loaded in the first memory 110 (shown in FIGS. 1 and 2) and parsed to determine the plurality of synonyms S1 to Sn. The one or more synonyms of each concept are mapped with the corresponding concept identifier of the plurality of concept identifiers C1 to Cn. In other words, the plurality of synonyms S1 to Sn is grouped based on the plurality of concepts associated with the plurality of concept identifiers C1 to Cn. The one or more synonyms of each concept associated with the corresponding concept identifier of the plurality of concept identifiers C1 to Cn are accommodated in a corresponding bucket of the plurality of buckets 302A to 302N. For example, the three synonyms S1, S2, and S3 are mapped with the first concept identifier C1 and the two synonyms S4 and S5 are mapped with the second concept identifier C2. The three synonyms S1, S2, and S3 mapped with the first concept identifier C1 are then accommodated in the first bucket 302A, the two synonyms S4 and S5 mapped with the second concept identifier C2 are accommodated in the second bucket 302B, and so on.

The plurality of synonyms S1 to Sn are stored in the second array 130. Specifically, each character of each synonym of the plurality of synonyms S1 to Sn is stored consecutively in the second array 130. Further, the plurality of synonyms S1 to Sn are distributed among the set of software threads T1 to Tn by allocating each synonym of the plurality of synonyms S1 to Sn to the corresponding software thread of the set of software threads T1 to Tn. The set of software threads T1 to Tn corresponds to the set of software threads 120A to 120N of FIG. 1.

Each processor of the set of processors P1 to Pn accesses at least one synonym of the plurality of synonyms S1 to Sn allocated to the corresponding software thread of the set of software threads T1 to Tn by establishing a correspondence between the set of processors P1 to Pn and the set of software threads T1 to Tn. The set of processors P1 to Pn corresponds to the set of processors 118A to 118N of the SIMD based processing device 112 of FIG. 1.

Further, a parallel search algorithm 304 operates on each input text document from the plurality of input text documents 126A to 126N. The parallel search algorithm 304 refers to an algorithm that may execute several instructions simultaneously on different processing devices, such as the set of processors P1 to Pn and consequently combine individual outputs to produce a final result. Specifically, the parallel search algorithm 304 refers to a piece of code that may be operated on each input text document from the plurality of input text documents 126A to 126N to find a presence of the one or more synonyms associated with each concept in each input text document of the plurality of input text documents 126A to 126N. For example, for the input text document 126A, if a software thread T1 is allocated with synonym "Lung cancer" and another software thread T2 is allocated with synonym "NSCL", then the parallel search algorithm 304 in the software thread T1 is responsible to detect the presence of the synonym "Lung cancer", by the processor P1 of the set of processors P1 to Pn, in the input text document 126A, and the parallel search algorithm 304 in the software thread T2 is responsible to detect the presence of the synonym "NSCL", by the processor P2 of the set of processors P1 to Pn, in the input text document 126A. Additionally, when the one or more synonyms of a given concept is found in the input text document of the plurality of input text documents 126A to 126N, the input text document may get tagged with the given concept to provide a tagged document of a plurality of tagged documents 306A to 306N. For example, when one or more synonyms of a first concept is found in the input text document 126A, the input text document 126A may get tagged with the first concept to provide a tagged document 306A, and when one or more synonyms of a second concept is found in the input text document 126B, the input text document 126B may get tagged with the second concept to provide a tagged document 306B.

Figure 4:
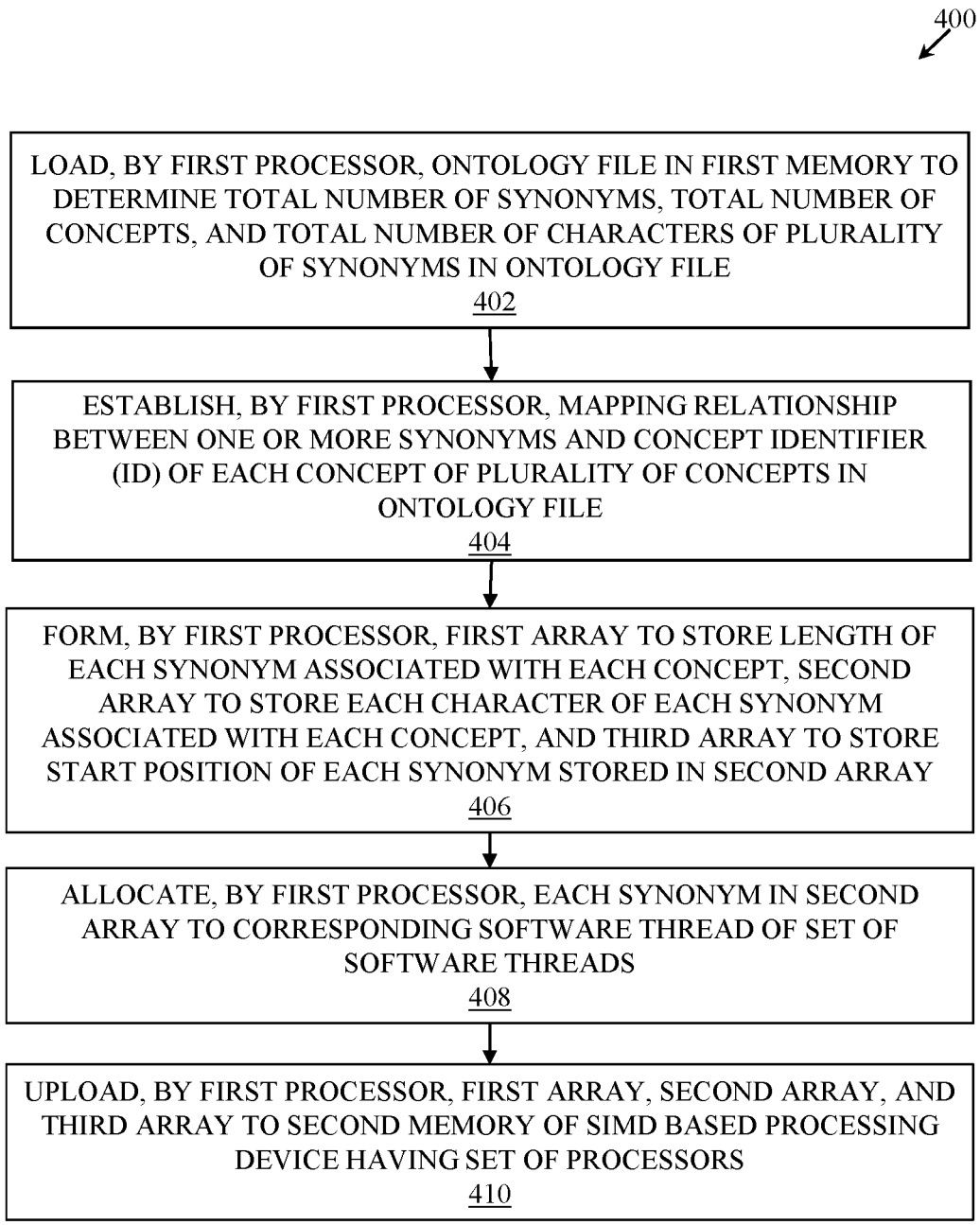
FIG. 4 is a flowchart of a method for workload management for distributing workload over the SIMD based parallel processing architecture, in accordance with an embodiment of the present disclosure.

FIG. 4 is a flowchart of a method of workload management for distributing workload over a single instruction and multiple data (SIMD) based parallel processing architecture, in accordance with an embodiment of the present disclosure. FIG. 4 is explained in conjunction with elements from FIGS. 1, 2, and 3. With reference FIG. 4, there is shown a flowchart of a method 400. The method 400 is executed at the server 102 (of FIG. 1). The method 400 may include steps 402 to 410.

At step 402, the method 400 includes loading, by the first processor 108, the ontology file 134 in the first memory 110 to determine the total number of synonyms, the total number of concepts, and the total number of characters of the plurality of synonyms S1 to Sn in the ontology file 134. Determination of the total number of synonyms, the total number of concepts, and the total number of characters of the plurality of synonyms S1 to Sn in the ontology file 134 at an initial step may facilitate easy distribution of workload.

At step 404, the method 400 further includes establishing, by the first processor 108, the mapping relationship between the one or more synonyms and the concept identifier C1 to Cn of each concept of the plurality of concepts in the ontology file 134. Mapping relationship between the one or more synonyms and the concept identifier C1 to Cn of each concept of the plurality of concepts in the ontology file 134 may group the plurality of synonyms S1 to Sn based on different concepts.

At step 406, the method 400 further includes forming, by the first processor 108, the first array 128 to store the length of each synonym associated with each concept, the second array 130 to store each character of each synonym associated with each concept, and the third array 132 to store the start position of each synonym stored in the second array 130. Conveniently, stored information in the first array 128, the second array 130, and the third array 132 may be accessed by accessing a particular index of the arrays 128, 130, 132.

At step 408, the method 400 further includes allocating, by the first processor 108, each synonym in the second array 130 to a corresponding software thread of the set of software threads 120A to 120N. To achieve maximum granularity, one synonym of the plurality of synonyms S1 to Sn in the second array 130 is allocated to one software thread of the set of software threads 120A to 120N.

At step 410, the method 400 further includes uploading, by the first processor 108, the first array 128, the second array 130, and the third array 132 to the second memory 116 of the SIMD based processing device 112 having the set of processors 118A to 118N. The content of each synonym associated with each concept is concurrently accessible on the SIMD based processing device 112 from the uploaded second array 130 by the set of processors 118A to 118N via the set of software threads 120A to 120N.

In accordance with an embodiment, the method 400 further includes forming, by the first processor 108, the plurality of buckets 302A to 302N adapted to accommodate the one or more synonyms of each concept associated with the corresponding concept identifier C1 to Cn. The plurality of buckets 302A to 302N may provide grouping of the plurality of synonyms S1 to Sn.

In accordance with an embodiment, the method 400 further includes establishing a correspondence between the set of processors 118A to 118N and the set of software threads 120A to 120N such that content of a given synonym of a given concept is accessible from the uploaded second array by a corresponding processor of the set of processors 118A to 118N via a corresponding software thread of the set of software threads 120A to 120N. Establishing the correspondence between the set of processors 118A to 118N and the set of software threads 120A to 120N may allow each of the set of processors 118A to 118N and each of the set of software threads 120A to 120N to form a connection in order to quickly access the content of the given synonym of the given concept.

In accordance with an embodiment, the method 400 further includes forming the ontology database 206 or the data warehouse 208 of the technical domain for the search engine 204 based on performing the concept tagging of the plurality of input text documents 126A to 126N on the SIMD based processing device 112 with the computational granularity greater than the defined threshold. The ontology database 206 or the data warehouse 208 may store the tagged documents 306A to 306N for future reference. The ontology database 206 or the data warehouse 208 may also be used for quick retrieval of a relevant document.

In accordance with an embodiment, the method 400 further includes obtaining the user input 210 of the one or more words in the search engine 204. In accordance with an embodiment, the method 400 further includes retrieving a relevant document or an unstructured text using the SIMD based processing device 112. Content of the one or more synonyms related to the one or more words and associated concept is searched on at least the SIMD based processing device 112 with the computational granularity greater than the defined threshold, based on the uploaded first array 128, the uploaded second array 130, and the uploaded third array 132 via the set of software threads 120A to 120N.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A method of workload management for distributing workload over a single instruction and multiple data (SIMD) based parallel processing architecture, the method comprising:
   loading, by a first processor, an ontology file in a first memory to determine a total number of synonyms, a total number of concepts, and a total number of characters of a plurality of synonyms in the ontology file;
   establishing, by the first processor, a mapping relationship between one or more synonyms and a concept identifier (ID) of each concept of a plurality of concepts in the ontology file;
   forming, by the first processor, a first array to store a length of each synonym associated with each concept, a second array to store each character of each synonym associated with each concept, and a third array to store a start position of each synonym stored in the second array;
   allocating, by the first processor, each synonym in the second array to a corresponding software thread of a set of software threads; and uploading, by the first processor, the first array, the second array, and the third array to a second memory of a SIMD based processing device having a set of processors, wherein content of each synonym associated with each concept is concurrently accessible on the SIMD based processing device from the uploaded second array by the set of processors via the set of software threads.

2. The method according to claim 1, wherein the ontology file comprises an ontology in a predetermined format.

3. The method according to claim 1, wherein, in order to access content of a given synonym stored at a designated position of the uploaded second array on the SIMD based processing device, the method further comprises deriving, by at least one of the set of processors, a start position of the given synonym from the uploaded third array by accessing the designated position in the uploaded third array.

4. The method according to claim 3, wherein, in order to access the content of the given synonym stored at the designated position of the uploaded second array on the SIMD based processing device, the method further comprises determining, by at least one of the set of processors, a length of the given synonym from the uploaded first array by accessing the designated position in the uploaded first array.

5. The method according to claim 4, wherein, in order to access the content of the given synonym stored at the designated position of the uploaded second array on the SIMD based processing device, the method further comprises deriving, by at least one of the set of processors, an end position of the given synonym by adding the length and the start position of the given synonym, and subtracting "1".

6. The method according to claim 5, wherein, in order to access the content of the given synonym stored at the designated position of the uploaded second array on the SIMD based processing device, the method further comprises accessing, by at least one of the set of processors, characters of the given synonym by accessing a group of characters between the start position and the end position of the given synonym from the uploaded second array.

7. The method according to claim 1, further comprising defining, by the first processor, a first length to the second array based on the total number of characters of the plurality of synonyms for the forming of the second array, wherein the second array is a byte array of the first length.

8. The method according to claim 1, further comprising forming, by the first processor, a plurality of buckets adapted to accommodate the one or more synonyms of each concept associated with a corresponding concept identifier.

9. The method according to claim 1, further comprising establishing a correspondence between the set of processors and the set of software threads such that content of a given synonym of a given concept is accessible from the uploaded second array by a corresponding processor of the set of processors via a corresponding software thread of the set of software threads.

10. The method according to claim 1, further comprising forming an ontology database or a data warehouse of a technical domain for a search engine based on performing concept tagging of a plurality of input text documents on the SIMD based processing device with a computational granularity greater than a defined threshold.

11. The method according to claim 10, further comprising:
obtaining a user input of one or more words in the search engine; and
retrieving a relevant document or an unstructured text using the SIMD based processing device, wherein content of one or more synonyms related to the one or more words and associated concept is searched on at least the SIMD based processing device with a computational granularity greater than a defined threshold, based on the uploaded first array, the uploaded second array, and the uploaded third array via the set of software threads.

12. A system for workload management for distributing workload over a single instruction and multiple data (SIMD) based parallel processing architecture, the system comprising:
a first processor and a first memory, wherein the first processor is configured to:
load an ontology file in the first memory to determine a total number of synonyms, a total number of concepts, and a total number of characters of a plurality of synonyms in the ontology file;
establish a mapping relationship between one or more synonyms with a concept identifier (ID) of each concept of a plurality of concepts in the ontology file;
form a first array to store a length of each synonym associated with each concept, a second array to store each character of each synonym associated with each concept, and a third array to store a start position of each synonym stored in the second array;
allocate each synonym in the second array to a corresponding software thread of a set of software threads; and
a SIMD based processing device that comprises a second memory and a set of processors, wherein the set of processors are configured to concurrently access content of each synonym of each concept from the second array via the set of software threads.

13. The system according to claim 12, wherein the SIMD based processing device is at least one of a graphical processing unit (GPU), or other SIMD based parallel processing device.

14. The system according to claim 12, wherein the SIMD based processing device is further configured to process an input text document independent of a host language in which the SIMD based processing device is hosted.

15. The system according to claim 12, wherein the first processor is further configured to upload the first array, the second array, and the third array to the second memory of the SIMD based processing device.

16. The system according to claim 12, wherein, in order to access content of a given synonym stored at a designated position of the uploaded second array on the SIMD based processing device, at least one of the set of processors is further configured to derive a start position of the given synonym from the uploaded third array by accessing the designated position of the uploaded third array.

17. The system according to claim 13, wherein, in order to access the content of the given synonym stored at the designated position of the uploaded second array on the SIMD based processing device, at least one of the set of processors is further configured to derive an end position of the given synonym by adding the length and the start position of the given synonym, and subtracting "1".

18. The system according to claim 17, wherein, in order to access the content of the given synonym stored at the designated position of the uploaded second array on the SIMD based processing device, at least one of the set of processors is further configured to access characters of the given synonym by accessing a group of characters between the start position and the end position of the given synonym from the uploaded second array.

19. The system according to claim 12, wherein the first processor is further configured to form an ontology database or a data warehouse of a technical domain for a search engine based on performing concept tagging of a plurality of input text documents on the SIMD based processing device with a computational granularity greater than a defined threshold.

20. The system according to claim 12, wherein the first processor is further configured to:
- receive a user input of one or more words in the search engine; and
- retrieve a relevant document or an unstructured text using the SIMD based processing device, wherein content of one or more synonyms related to the one or more words and associated concept is searched on at least the SIMD based processing device with a computational granularity greater than a defined threshold, based on the uploaded first array, the uploaded second array, and the uploaded third array by the set of processors via the set of software threads.

* * * * *